(12) United States Patent
Ikeda et al.

(10) Patent No.: US 7,242,860 B2
(45) Date of Patent: Jul. 10, 2007

(54) OPTICAL PROTECTION SWITCHING USING 2 BY 2 SWITCHING FUNCTIONS

(75) Inventors: Hiroki Ikeda, Tachikawa (JP); Shigeki Kitajima, Kawasaki (JP); Shoichi Hanatani, Saitama (JP)

(73) Assignee: Hitachi America, Ltd, Brisbane, CA (US)

( * ) Notice: Subject to any disclaimer, the term of this patent is extended or adjusted under 35 U.S.C. 154(b) by 618 days.

(21) Appl. No.: 10/274,244

(22) Filed: Oct. 18, 2002

(65) Prior Publication Data

US 2004/0076427 A1 Apr. 22, 2004

(51) Int. Cl.
*G02F 1/00* (2006.01)
(52) U.S. Cl. ............... 398/5; 398/3; 398/4; 398/7; 398/10; 398/12; 398/13; 398/14; 398/17; 398/20; 398/22; 398/23; 398/24; 398/33; 398/45; 398/41; 398/42; 398/50; 398/56; 398/57; 398/59; 398/79; 385/24; 385/16; 385/17; 385/18; 370/216; 370/217; 370/218; 370/219; 370/220; 370/221; 370/222; 370/223; 370/224; 370/225; 370/227; 370/228
(58) Field of Classification Search ............... 398/5, 398/3, 4, 7, 10, 12, 13, 14, 17, 20, 22, 23, 398/24, 33, 45, 41, 42, 50, 56; 385/24, 57, 385/59, 79, 16, 17, 18; 370/216, 217, 218, 370/219, 228, 220, 221, 227, 222, 223, 224, 370/225
See application file for complete search history.

(56) References Cited

U.S. PATENT DOCUMENTS

| | | | |
|---|---|---|---|
| 5,003,531 A | 3/1991 | Farinholt et al. | |
| 5,706,277 A * | 1/1998 | Klink | 370/220 |
| 5,717,796 A * | 2/1998 | Clendening | 385/24 |
| 5,740,157 A | 4/1998 | Demiray et al. | |
| 6,115,155 A * | 9/2000 | Liu et al. | 398/5 |
| 6,292,281 B1 | 9/2001 | Bala et al. | |
| 6,307,653 B1 | 10/2001 | Bala et al. | |
| 6,331,905 B1 | 12/2001 | Ellinas et al. | |
| 6,915,075 B1 * | 7/2005 | Oberg et al. | 398/9 |

FOREIGN PATENT DOCUMENTS

EP 1037492 A2 9/2000

* cited by examiner

*Primary Examiner*—Hanh Phan
(74) *Attorney, Agent, or Firm*—Sughrue Mion, PLLC; Joseph Bach

(57) ABSTRACT

A network is protected against interruption of service while one or more faulty switches or optical fiber transmission lines are repaired or replaced, by an interconnecting configuration of small N×N optical input/output switches, where N is 2 or greater than 2. The switches are configured among protection and working transmission lines. The small number of fibers for each switch improves repair and installation connection reliability and permits configurations that flexibly meet differing requirements. Also the fault is monitored with a fault check signal.

33 Claims, 10 Drawing Sheets

OPTICAL PROTECTION SWITCHING USING 2 BY 2 SWITCHING FUNCTIONS

FIELD OF THE INVENTION

The present invention relates the protection of an optical fiber mission network with line fault and switch fault protection.

BACKGROUND OF THE INVENTION

United States carriers have been suffering from unpredictable failures in the transmission lines over the continent more often than the occurrence of switching equipment failure. The major failure is an optical fiber fault caused by a human error or by a natural catastrophe, such as a flood.

Therefore, there is a need for an improved protection of an optical fiber transmission network with line fault and switch fault protection.

SUMMARY OF THE INVENTION

These and other needs are addressed by the present invention.

As a result of analyzing the prior art, the inventor has found a need for: (1) A protection system in DWDM (Dense Wavelength Division Multiplex) networks; and (2) A protection system in networks without protection capability in the transmission layer, such as Ethernet.

To protect against the consequences of line and switching fault problems, SONET protection systems have been deployed for many years in the transmission layer of a network, where a physical signal is carried over an optical fiber. However, SONET systems are expensive for networks that only need a protection capability and do not need the many additional functions of a SONET system. The SONET system has many functions to manage a transmission line, such as an electronic switching capability and an add-drop function. Moreover, the SONET system is not easy to upgrade for point-to-point communications, 1:N switching and ring topology, which thereby requires that an existing SONET system must be replaced when the topology is changed.

Therefore, the present invention analysis of the prior art SONET system as to its problems and their causes has lead to the need for and the solution of a more effective and flexible optical transmission network protection system.

The inventor has analyzed network construction cost, the cost of restoring service after either a switch failure or a line failure (both equipment and repair) and the increased handling of optical fibers during repair that results in an increased likelihood of further line failures.

It has been thought that single unit optical switches with as many inputs and outputs as possible is a good investment, because the cost per port decreases as the number of ports in a single switch increases. However, the inventor has compared this cost with the observation that the connection of individual fibers to a switch is done by hand and is very difficult. This hand repair results in many wrong and unsatisfactory connections of the extremely fine fibers, which is found to be the major cause of line failure. Therefore, as a part of the present invention, a solution is to use a switch with a small number of ports rather than a switch with a large number of ports, to correspondingly reduce the likelihood of a misconnection and to reduce the labor involved. This solution of the present invention is far more cost effective in the long run than using large switches. Particularly, the 2×2 optical switch has an advantage of ease in handling for both original installation and replacement for upgrading or repair compared with a switch having a far greater number of ports.

The above solution of the present invention provides flexibility in connecting the small switches. This solution of the present invention involves a connection arrangement for a large number of lines with the use of switches that have few ports, which at first appears to involve conflicting requirements according to the prior art teachings.

It is known to use a switch with a large number of ports to gain a low cost per port. But, if a 32×32 switch is used for only 6 ports, for example, the cost per usable port has increased substantially over the cost per available port. The present invention that configures multiple low port number switches avoids this problem.

One can only imagine the extremely tedious replacement of a 128×128 switch that involves at least 256 hand connections of the extremely fine optical fibers. Then, it is easy to understand that the main cause of failure is found to be a misconnection of the fibers due to inaccurate or incomplete manual fiber connections. Therefore, a large switch has a low port cost, but a high cost of installation and a high line failure rate.

Further, it is desirable to provide for ease of configuration and flexibility of configuration, because a change in network topology flows from unpredictable traffic patterns. Therefore, future flexibility of a system constructed according to the present invention is an advantage.

The embodiment provides an optical protection system having the following functions and modules:
1) A 2-by-2-switching function that performs optical switching for an optical signal.
2) A switching method and switching controller that manages the 2-by-2 switching functions according to failure information.
3) A receiver that receives failure information from the head-end side or detects a failure on a transmission line.
4) A transmitter that sends information upon the event of a failure being detected at a tail-end side.

Features of this invention include:
1) Enhancement of fault protection availability in optical core networks, for example DWDM networks.
2) A cost-effective and small circuit board-based solution in comparison with an expensive and large SONET network solution.
3) In-service repair and easy upgrade is available without affecting working traffic.
4) An adaptable solution for an Ethernet network in the metro area network.

Still other aspects, features, and advantages of the present invention are readily apparent from the following detailed description, simply by illustrating a number of particular embodiments and implementations, including the best mode contemplated by the inventor for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawing, in which like reference numerals refer to similar elements, and in which.

DESCRIPTION OF THE PREFERRED EMBODIMENT

Figure 1:
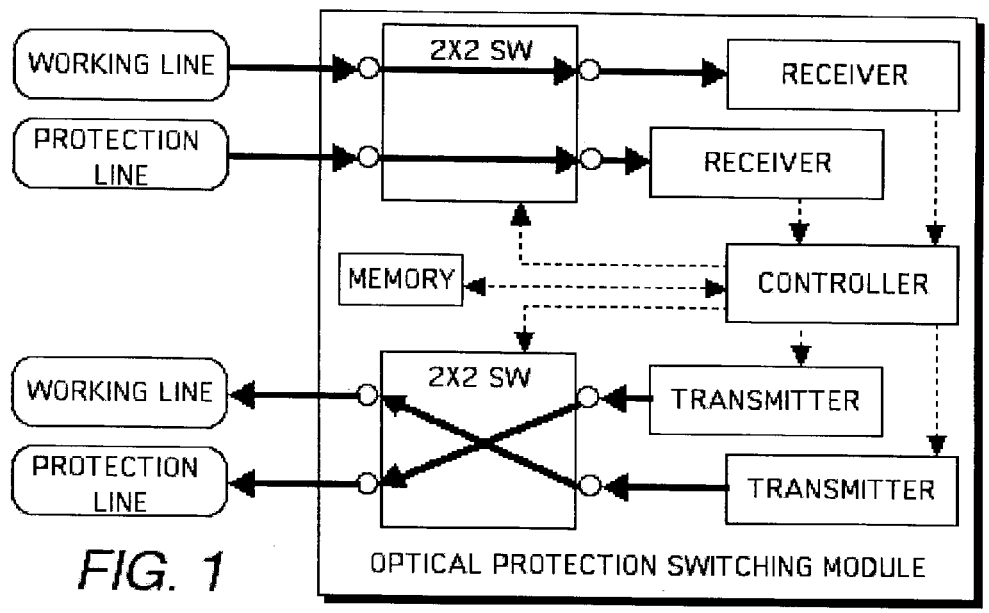
FIG. 1 shows a basic fault protected 2×2 optical switch based network.

A switching module, system, method and software for cost effective and flexible configuration network protection are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

The preferred embodiment satisfies the above-mentioned needs by solving the mentioned problems for optical network protection by using 2×2 optical switches, or other small switches, which are connected to improve the flexibility, cost effectiveness, availability and reliability of a network. Switches with a greater number of input or output ports than two may be used according to the broader aspects of the present invention.

The 2×2 optical switch may be integrated and packaged with a common interface board, which can be used for all configurations described hereafter with respect to the figures of the drawing. The switch preferably has optical switching capabilities, inside the switch, but may also involve electrical signal switching inside the switch. In either event, which are examples, the important aspect of the switch is that it has optical fiber input and output ports, for such optical fibers produce the problems identified, analyzed as to causes and solved by the present invention.

The logical and physical input port to output port connection inside the switch is dependent on the state or mode of the switch. These modes are BAR and X-BAR (cross-bar) for the 2×2 switch, which is well known in the switch art. The flexibility of switch connection according to the embodiment configurations provides advantageous connection configurations to bypass faulty switches and faulty lines during repair without interrupting service.

FIG. 1 shows a basic fault protected 2×2 optical switch based network. The system has a CONTROLLER, 2×2 switches (2×2 SW), transmitters and receivers. The controller manages the 2×2 switching functions according to a program stored in the MEMORY.

The receiver may receive a failure event signal, which can be provided in any known manner, for example. The failure event signal may be extracting from a received frame header or provided by a known device (not shown) for directly detecting a physical failure. The transmitter then sends information on the failure event being detected on a line to a receiver (not shown) at the other side of the transmission line, for example, by placing failure event information into a header in a control or signal frame or packet.

In this embodiment, the 2×2 optical switches each have two inputs and two outputs with cross-bar switching functions between the inputs and the outputs in a well known manner. For purposes of illustrating the two switching functions, the top switch 2×2 SW is in the normal bar state or mode, whereas the bottom switch 2×2 SW is in the activated cross-bar state or mode.

The U.S. Pat. No. 6,292,281, to Bala et al, issued Sep. 18, 2001, whose disclosure is incorporated herein, is an example construction of an N×N optical switch that could be employed with the present embodiment. Optical switches are preferred because.

The present invention may completely bypass a switch upon detection of the fault event to permit faulty switch replacement without interruption of service, because of the flexibility of connections between the small switches. The use of the smaller switches involves fewer reconnections to avoid human connection errors, which solves problems unique to the connection of optical fibers. However, the switches could be electrical and still service optical fiber transmission lines and gain the advantages of the present invention.

Figure 2:
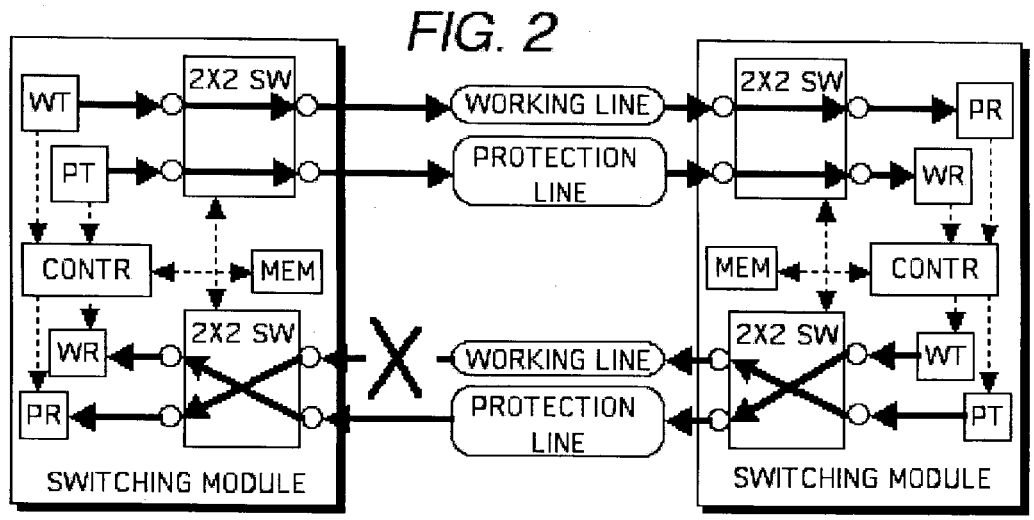
FIG. 2 shows a network segment that includes 2×2 switch based optical protection switching modules in more detail.

FIG. 2 shows a network segment that includes 2×2 switch based optical protection switching modules. The right side or east node is shown in more detail in FIG. 1, and the west side or node is a mirror image of the east side switching module. During normal operation, all of the switches are in the bar mode or state, for example as shown by the upper switches.

For example, when a working line optical transmission fiber is cut on an east bound working line, as indicated by the X, a working receiver WR at the east side switching module will detect the failure event. Upon detection, the working receiver so notifies the controller, (CONTR), which controller operates according to a program stored in its memory (MEM). The controller then sends a control signal or message to both or either of the working transmitters (WT) and the protection transmitters (PT) to inform the west side switching module at another node of the failure event.

The switching module at the west side node receives the control signal at the working receiver (WR) and/or the protection receiver (PR), which then communicates the fault to its controller. Thereby, the switching module at the west side node will detect the failure event and decide whether or not protection switching should be performed. Alternatively, the decision could be made at a remote site, though less preferred.

When protection switching is performed, the switches at both the east and west nodes are simultaneously activated to the cross-bar mode, as shown in FIG. 2. The switching is synchronized to occur substantially together. This means that the affected switches are activated at the same time or within an interval sufficient to prevent interruption of or corruption of valid data after the switching is started. As an example, switching may occur between two sent packets on the transmitting side and between the same two packets when received on the receiving side, taking into consideration packet travel time, so that there will be no corruption in addition to what may have been caused by the fault itself.

As a result of the switching, it is seen that the working line is now isolated or bypassed, without interruption of service, which service is now along the protection line in the east to west direction. Then, a workman may repair of replace the faulted working line. After the completion of the switching, a continuous, periodic or intermittent line check signal from the east side protection transmitter PT is used to monitor the working line having the failure. When the west side protection receiver PR receives the check signal, such is an indication that the fault has been fixed. This procedure is useful to find the status of the working line, in order to detect whether or not the working line has recovered.

The basic configuration of the 2×2 switches at the nodes of FIG. 2 is applicable to N×N switches, where N is a number equal to or greater than 2, for example a 4×4 switch.

FIGS. 1, 2, 3, 4, 7, 8, 11, 12 and 13 illustrate the basic embodiment of the invention. The embodiments to follow employ the basic features of FIGS. 1 and 2, such as the transmitters, receivers, controllers, memory and the above descriptions of their workings. In the descriptions of the following figures, the above material will not be repeated in order not to obscure the inventive new features of such additional embodiments and to concentrate the subsequent description on such features that differ from FIGS. 1 and 2.

However, there is a problem with such a configuration of FIGS. 1 and 2, regardless of how large is N. It is seen from FIG. 2 that when a switch fails, service is interrupted on the working and protection lines to or from that switch and when the switch is removed, which interruption continues until the faulty switch is replaced. A solution to this problem is provided by the embodiment of FIG. 3, which includes the features of FIG. 2.

Figure 3:
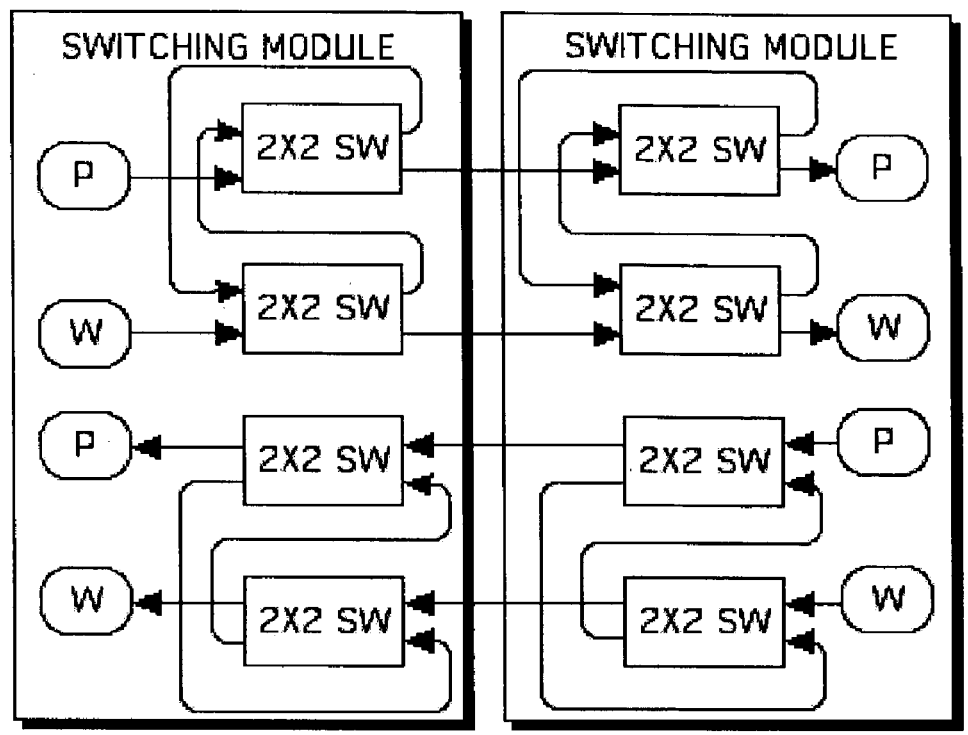
FIG. 3 shows an embodiment of the present invention, with east and west fault protected optical switching modules, for full bi-directional operation.

FIG. 3 shows an embodiment of the present invention. In FIG. 3, east and west switching modules are shown for transmitting signals from east to west with the lower half of the switches and from west to east with the upper half of the switches, for full bi-directional operation.

The embodiment of FIG. 3 provides 1:1 optical protection. Each of the switching modules is shown in a simplified form, with P representing the protection line, receivers, transmitters, controller, memory and bus, and W representing the working line, transmitter, controller, memory and bus. Details of the transmitters, receivers, controller, memory and bus are apparent from FIG. 1, although such details are omitted from FIG. 3 and subsequent figures to avoid obscuring the new features of the embodiments.

FIG. 3 differs from FIGS. 1 and 2, which may be considered as portions of FIG. 3, in the illustration of more than one 2×2 switch for each transmitting direction of each switching module. Two switches for each direction of each module are illustrated in FIG. 3, as a specific example. An advantage of this connection configuration of N×N switches, where N is two or greater, is that when a switch fails, the failed switch is bypassed without interrupting service, on either side (east or west), and the bypassed switch may then be replaced without disrupting service.

Figure 4:
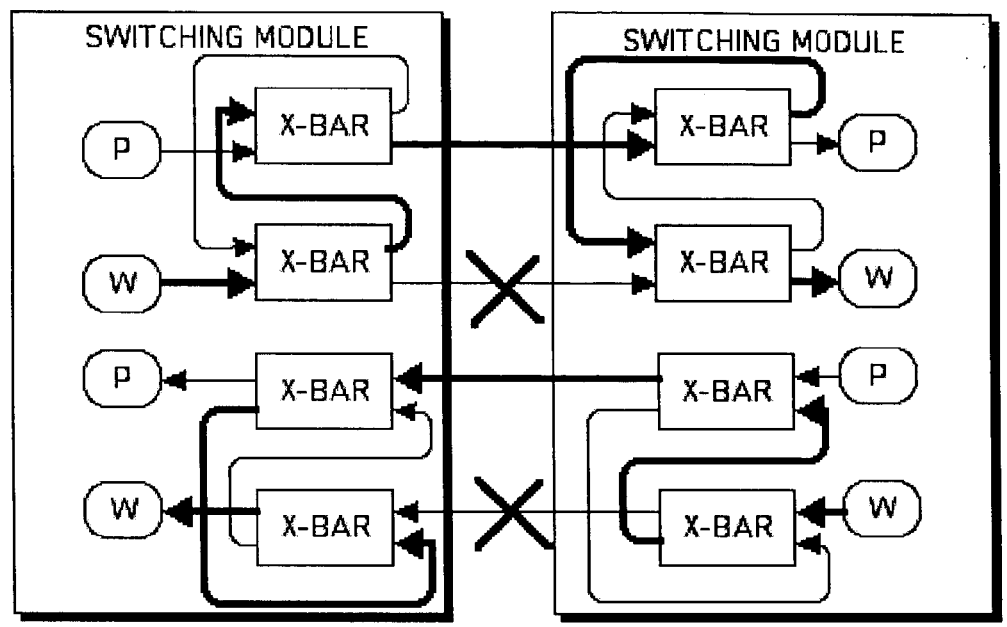
FIG. 4 shows the operation and switch modes of the embodiment after fault was detected.

FIG. 4 shows the operation and switch modes of the embodiment of FIG. 3 after a working line fault was detected in the west to east working line as indicated by the X and the east to west working line as indicated by the X. The embodiment will function for only one fault and two have been shown merely as an example. The BAR and X-BAR states of the switches are shown. The newly created operative path from the working transmitter to the working receiver and through the protection line is shown in darker lines for clarity of illustration. The lighter lines indicate a newly created fault check path between the protection transmitter and the protection receiver that includes the line fault, which fault check path may be monitored with a check signal to determine when the fault has been corrected.

Figure 7:
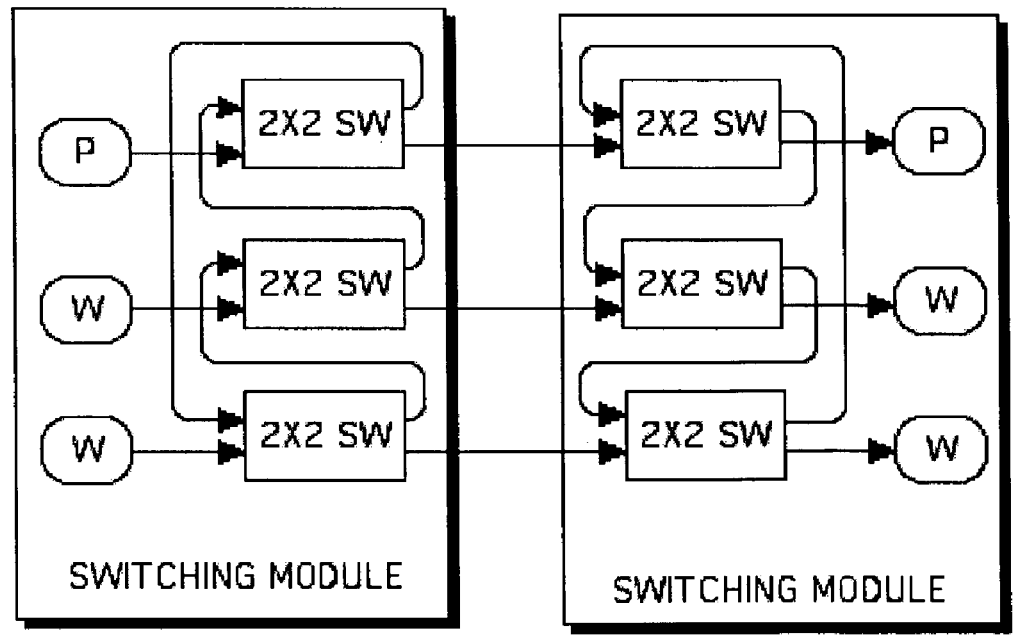
FIG. 7 shows a 1:N optical fault protection system embodiment of the present invention.

FIG. 7 shows a 1:N (one protection line to N working lines) optical protection system embodiment of the present invention. The N number can be extendable as desired in the same way that the extra switches of FIG. 7 have added to the embodiment of FIG. 3. Effectively, FIG. 3 may be considered as a sub-combination of FIG. 7 as an alternative to considering it as a separate embodiment. In FIG. 7, east and west switching modules are shown for transmitting signals from east to west, and the corresponding portions of these modules for transmitting from west to east are omitted for clarity of what is important. The construction of a full bi-directional module, for the FIG. 7 embodiment, is clear after the review of FIGS. 2 and 3.

The embodiment of FIG. 7 shows each of the switching modules in a simplified form, with P representing the protection line, receivers and transmitters and W representing the working line, transmitters and receivers. Details of the transmitters, receivers, controller and memory are apparent from FIG. 1 although omitted from FIG. 7 to avoid obscuring the new features of the embodiments.

FIG. 7 differs from FIG. 3, which may be considered as a portion of FIG. 7, in the illustration of more than two 2×2 switches for each transmitting direction of each switching module, three switches for each direction of each module being illustrated as a specific example. An advantage of this configuration of N×N switches, where N is two or greater, is that when a switch fails, the failed switch is bypassed without interrupting service, on either side (east or west), and the bypassed switch may then be replaced without disrupting service.

Figure 8:
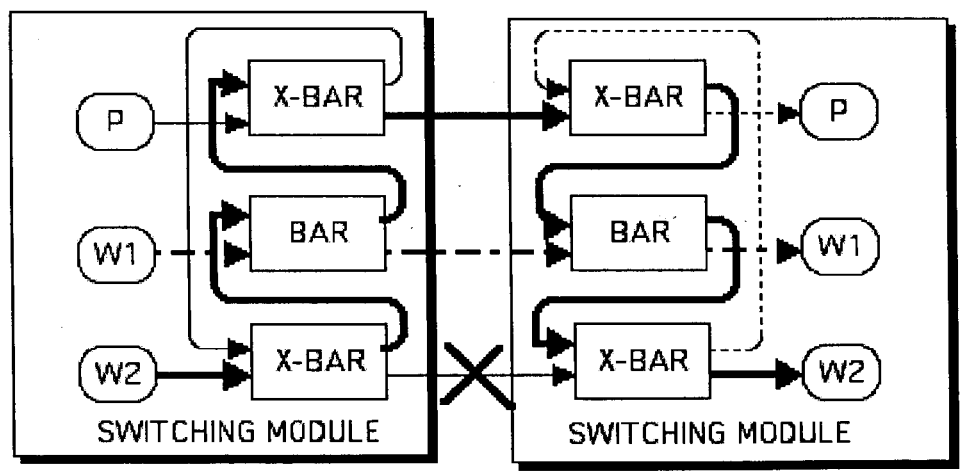
FIG. 8 shows the operation and switch modes of the embodiment of FIG. 7 after a working line fault was detected in one of the west to east working lines.

FIG. 8 shows the operation and switch modes of the embodiment of FIG. 7, after a working line fault was detected in one of the west to east working lines as indicated by the X. The embodiment will function for one line fault and still maintain the same number of operative paths. With the switches being the preferred WDM (wave length division multiplexing) optical switches, two working line faults could be handled by switching all of the working signals through the protection line with WDM, which may entail reassigning of wavelengths to prevent interference.

The BAR and X-BAR states of the switches are shown. The newly created operative path from the lower working transmitter to the protection receiver and through the protection line is shown in darker lines for clarity of illustration. The lighter lines indicate a newly created fault check path between the protection transmitter and the lower working receiver. The fault check path includes the line fault, which path may be monitored with a check signal to determine when the fault has been corrected.

For each new operative path (heavier lines) and fault check signal path (lighter lines), the controller logically changes the physical protection receiver to a logical working receiver and the physical lower working receiver to a logical fault check signal monitoring receiver. The medium weight dot-dash lines show a second working path that is not affected by the protection switching and the line fault. The dotted lighter lines show a path that is not used while awaiting repair. The controller sends a signal to the faulty switch to place it in the bar mode (preferably the default or normal state of the switches). Thus the faulty line is bypassed and when the line becomes operative again, the fault check signal is then received to indicate the repair or correction of the fault.

With respect to FIG. 8, if the present fault was corrected and a new fault detected in the middle or top working line: the two switches of the lower, now operative, working path would be placed in the bar mode; and the transmitting side switch of the faulty line, here the middle left hand side switch, would be placed in the X-bar mode.

In general, by comparing FIGS. 2, 3 and 8, it is seen that to correct a faulty working line, the transmitter of that working line and the protection transmitter are placed in x-bar mode. Also the receivers of that working line and the protection line may be logically exchanged for each of FIGS. 2, 3 and 8, as shown in FIGS. 3 and 8. As an alternative to the logical exchange operation, the embodiments of FIGS. 2, 3 and 8 may place the receiving side switch of the faulty line in x-bar mode, as in FIG. 2, so that there is no need to logically exchange receivers.

Figure 11:
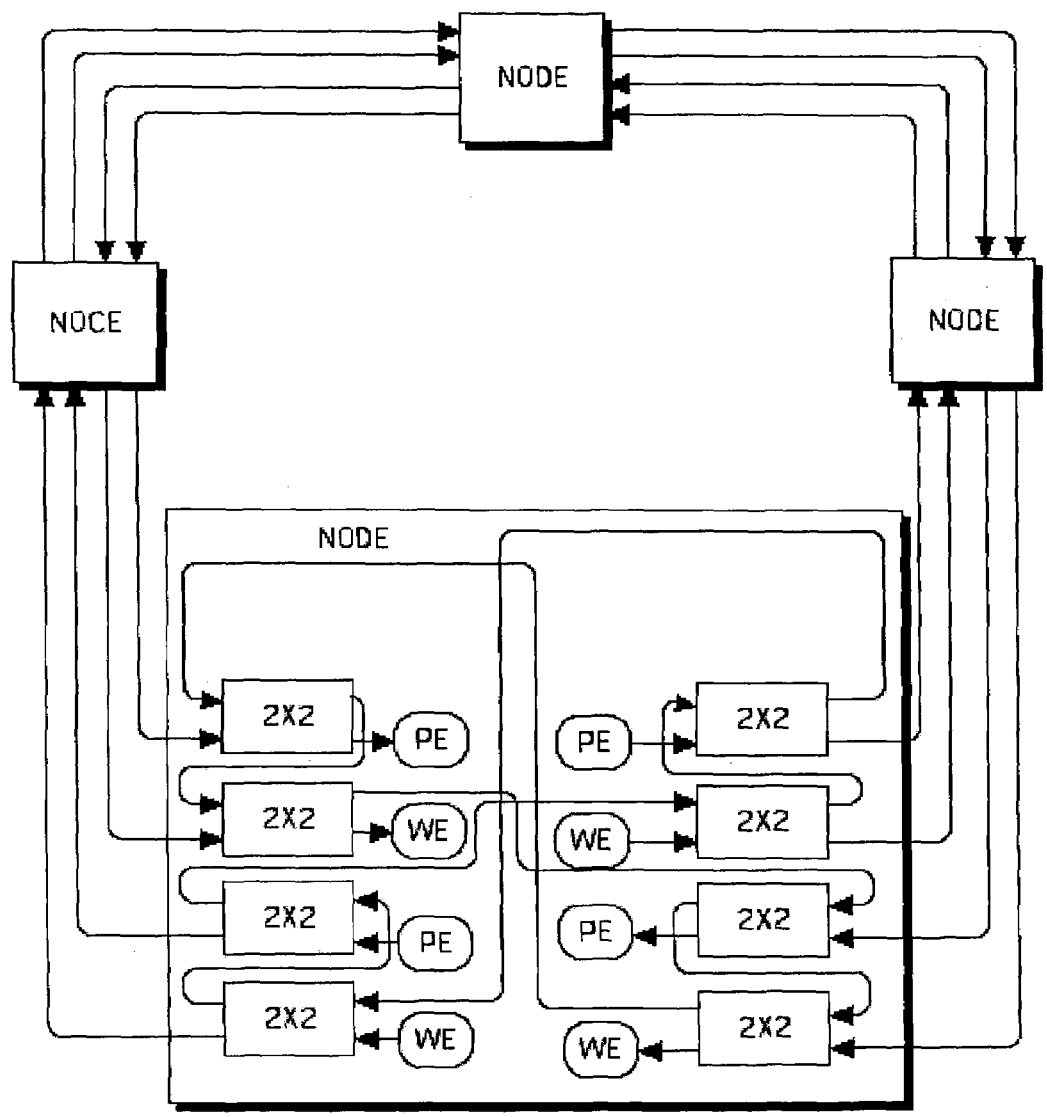
FIG. 11 shows a ring network with a fault protection system according to the present invention that uses the 2×2 optical switches.

FIG. 11 shows an embodiment of a ring network, with a fault protection system according to the present invention that uses the 2×2 optical switches. An advantage of this configuration of N×N switches, where N is two or greater, is that when a switch fails, the failed switch is bypassed without interrupting service in the ring network and the bypassed switch may then be replaced without disrupting service. Also a line fault may be bypassed without interrupting service.

Figure 12:
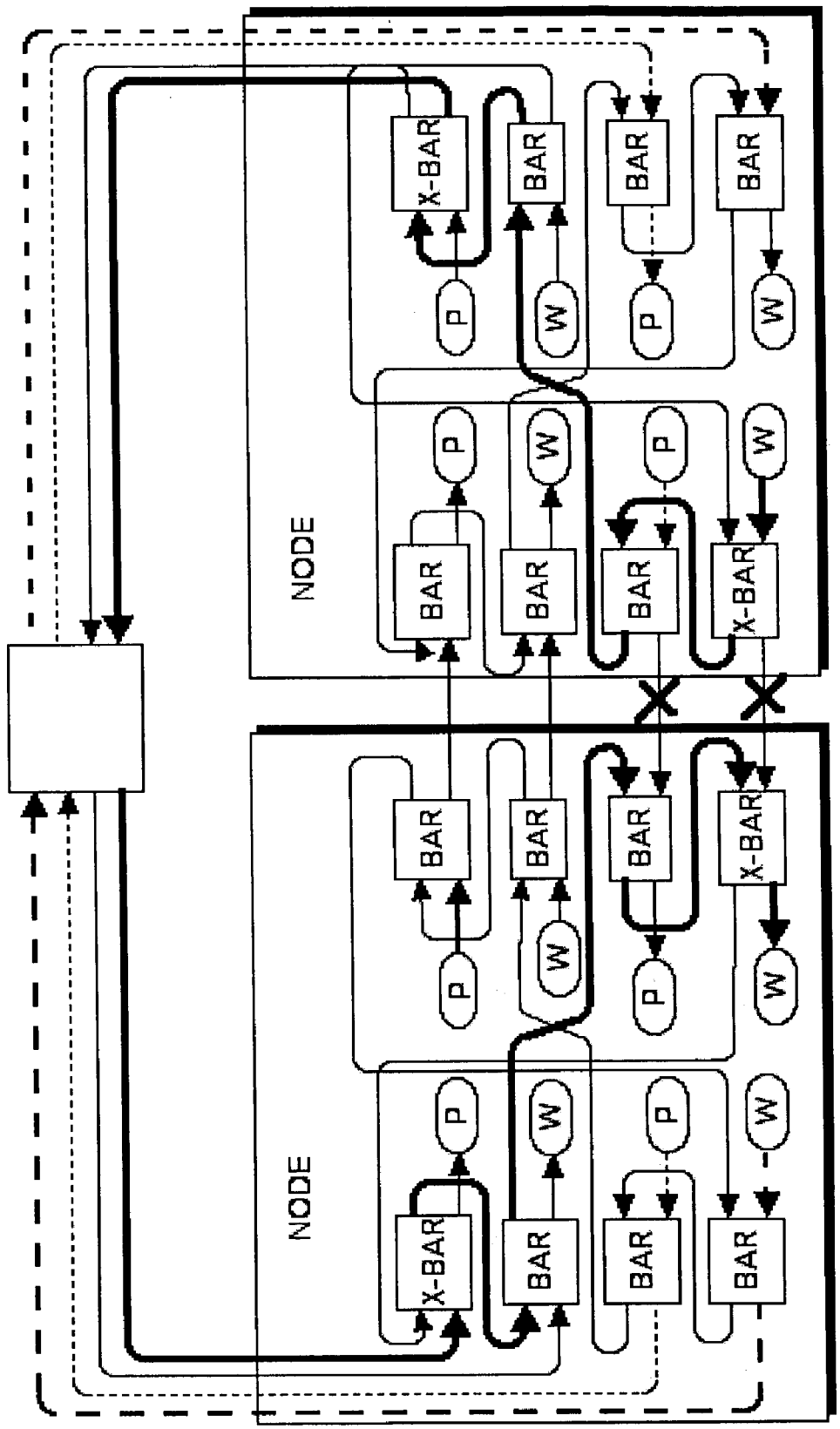
FIG. 12 shows a ring network with faults bypassed.

FIG. 12 shows the ring network of FIG. 11 with two fault switches on the receiving side bypassed For each new operative path (heavier lines) and fault check signal path (dotted and dot-dashed lines) of FIG. 12, the controller logically changes some of the physical transmitters and receivers to respective logical ones as shown in the drawing and previously explained with respect to other embodiments and the switch modes are set as indicated. Thus the faulty switches and faulty lines are bypassed to continue service and when they become operative again, the check signal is then received to indicate the repair or correction of the switch or line fault.

Figure 13:
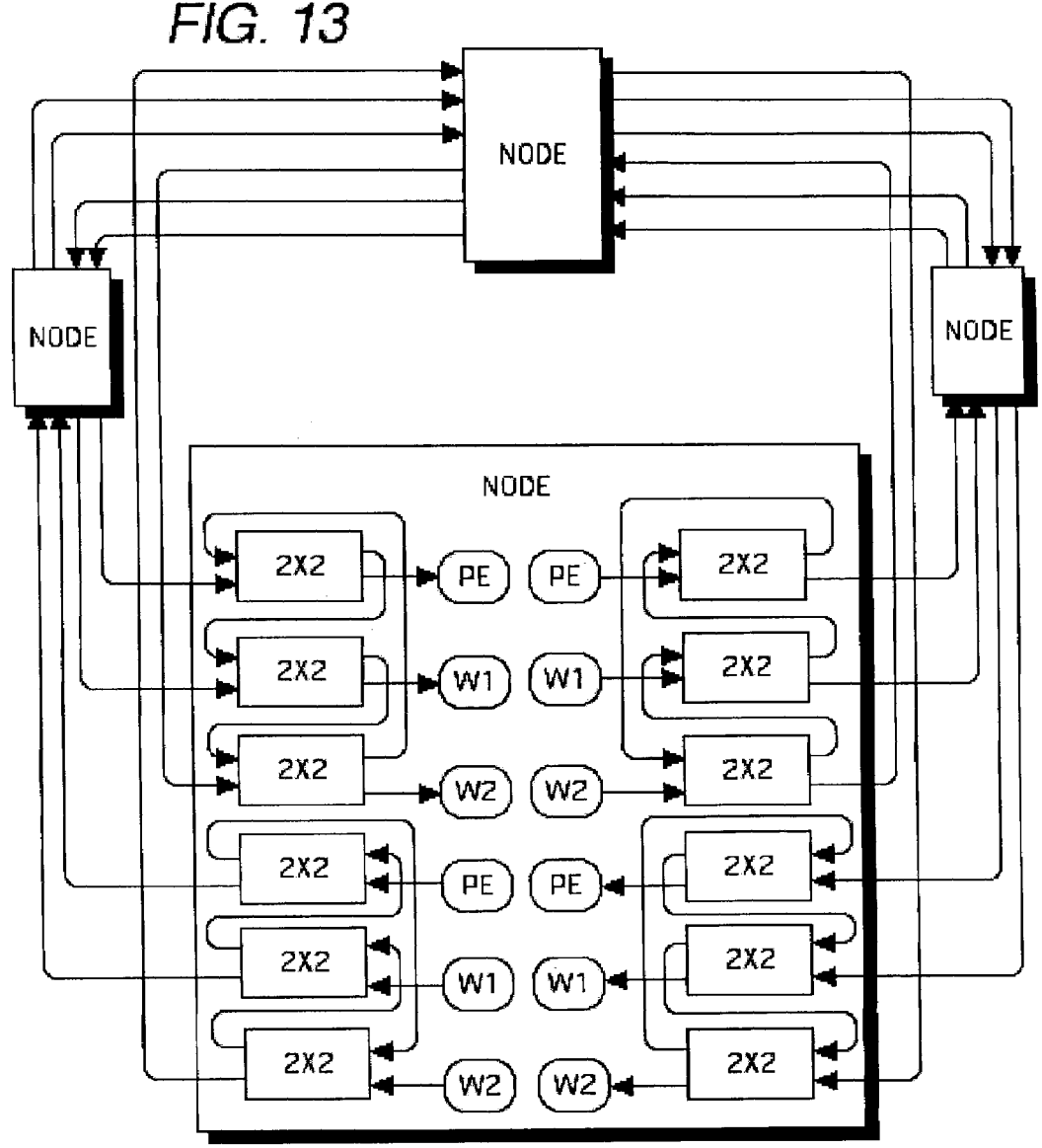
FIG. 13 shows a mesh network with fault protection according to the present invention.

A mesh network, as shown in FIG. 13, has every node connected directly to every other node. Therefore a virtual ring network can be formed within the physical mesh network, for example, the virtual ring network may have four nodes. Such a virtual ring network within a physical mesh network, ignoring the connections and nodes not in the ring, is illustrated in FIGS. 11 to 13. The network can be protected as shown and described with respect to FIGS. 11 to 13.

In a similar manner, a virtual ring network can be formed from other topologies, such as a cube topology or hypercube topology, and the fault protection applied as in FIGS. 11 to 13.

Generally, in a ring type network, such as that shown in FIG. 12, a signal from a first Working Transmitter at a first node goes to a second Working Receiver at a second node via a working line connected between the first and second nodes when there is no fault. If a failure in the working line occurs, the signal goes to the second Working Receiver through a protection line in the same direction as the working line in the manner shown in FIG. 4. However, if failure occurs in both the working and the protection lines, the signal goes to the second Working Receiver via protection line(s) in inverse direction as shown in FIG. 12.

There are two types of failures in an optical network: optical fiber failure and optical switch failure. The forgoing embodiment can be applied to the optical fiber failure. Also, there are two types of failure in an optical switch: mechanical failure in switching unit and light wave guide failure. As the light waive guide failure hardly ever occurs, it may be inconsiderable. Accordingly, it is not mentioned in this embodiment. The mechanical failure means failure where the 2×2 switch can not be switched to the "X-BAR" state from "BAR" state. In the mechanical failure, the failed 2×2 switch cannot be in the X-BAR state and stays in the "BAR" state where signals can go through the switch. In this case, the switch stays in the "BAR" state, so that light signals can go through the switch. Accordingly, even if the mechanical failure occurs at a switching module, the optical network system using it still works as long as any working line works.

Figure 5:
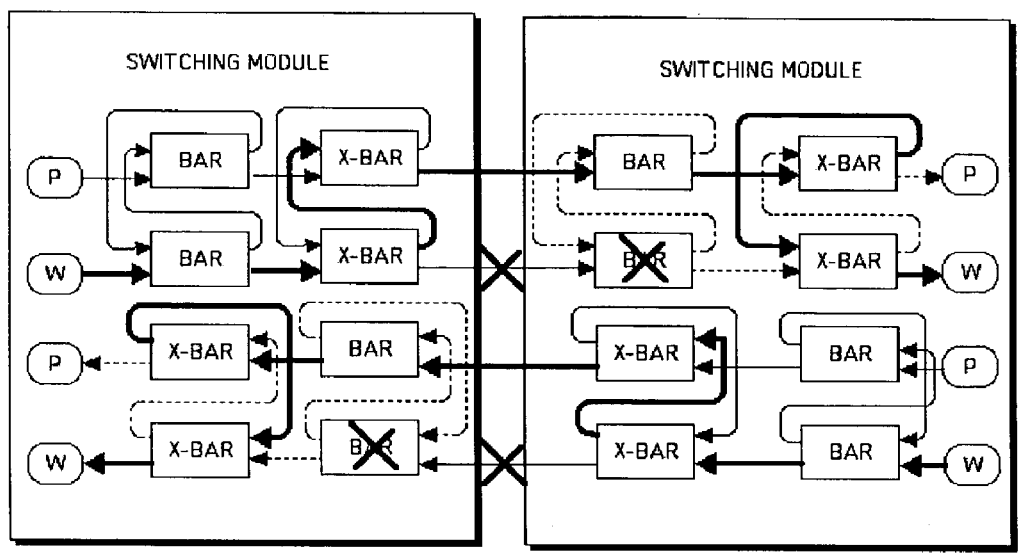
FIG. 5 shows the operation and switch modes of the embodiment after fault was detected.
Figure 6:
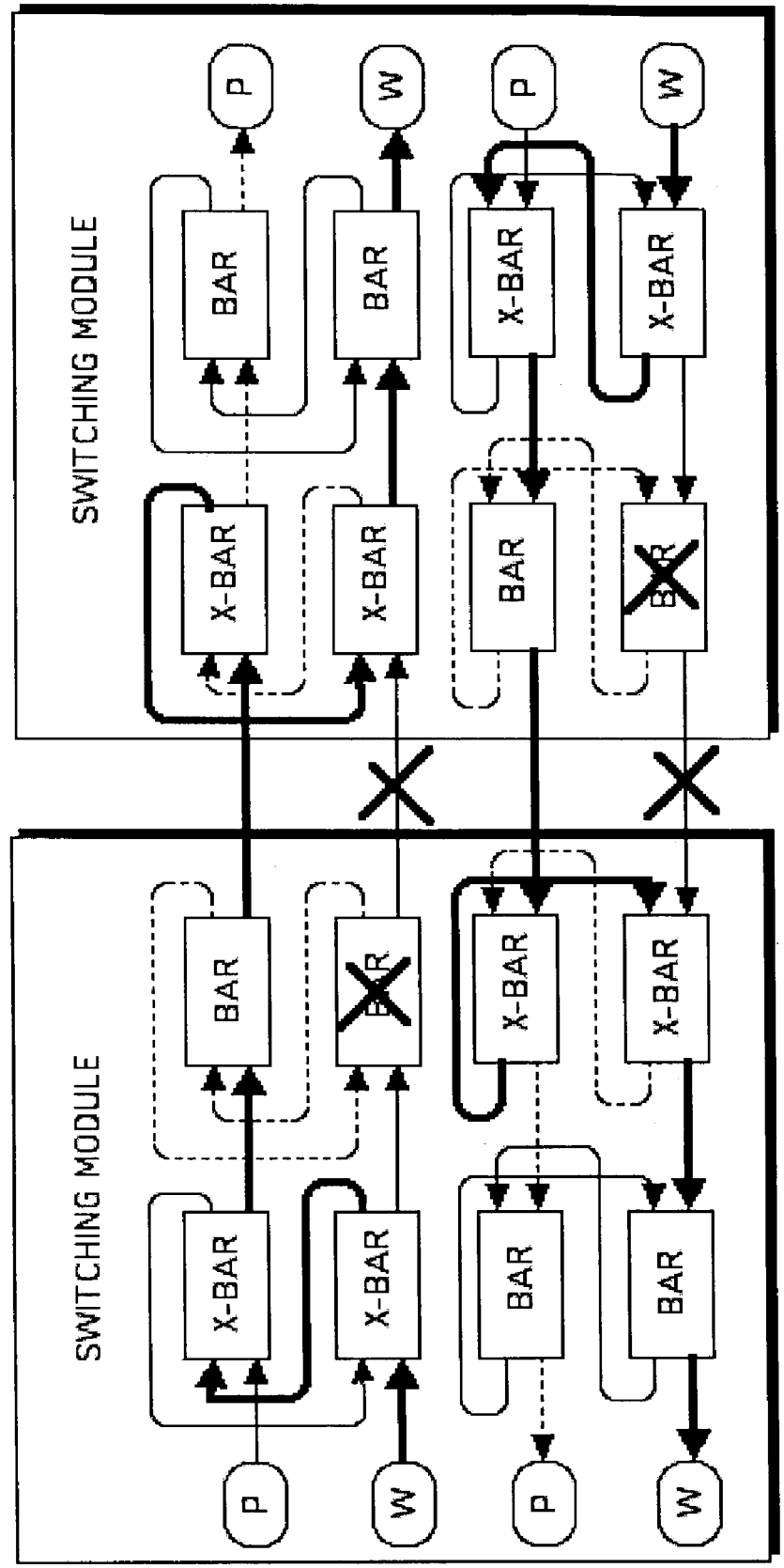
FIG. 6 shows the operation and switch modes of the embodiment after fault was detected.

However, if there occurs failure in a working line, development of the forgoing embodiment may be necessary. The embodiment will be given. According to the invention, even if the mechanical failure occurs at a switching module, the optical network system still works. As shown in FIGS. 5-6, signals from the protection receiver and the working transmitter respectively go to the protection receiver and the working receiver. FIGS. 5-6 protect against both the mechanical failure and the working line failure with the exemplary arrangement of switching modules FIGS. 5 and 6 show the operation and switch modes with fault as indicated in each case by the X. Of course, the embodiment will function for only one switch fault or only one line fault, but two have been shown merely as an example. The BAR and X-BAR states of the switches are shown. The newly created operative path from the working transmitter to bypass the fault or faults is shown in darker lines for clarity of illustration.

As shown in the attached FIG. 8, signals form the protection transmitter P and the working transmitters W1, W2 in the switching module to the left respectively go to the protection receiver, the working receivers 1 and 2 in the switching module to the right.

Figure 9:
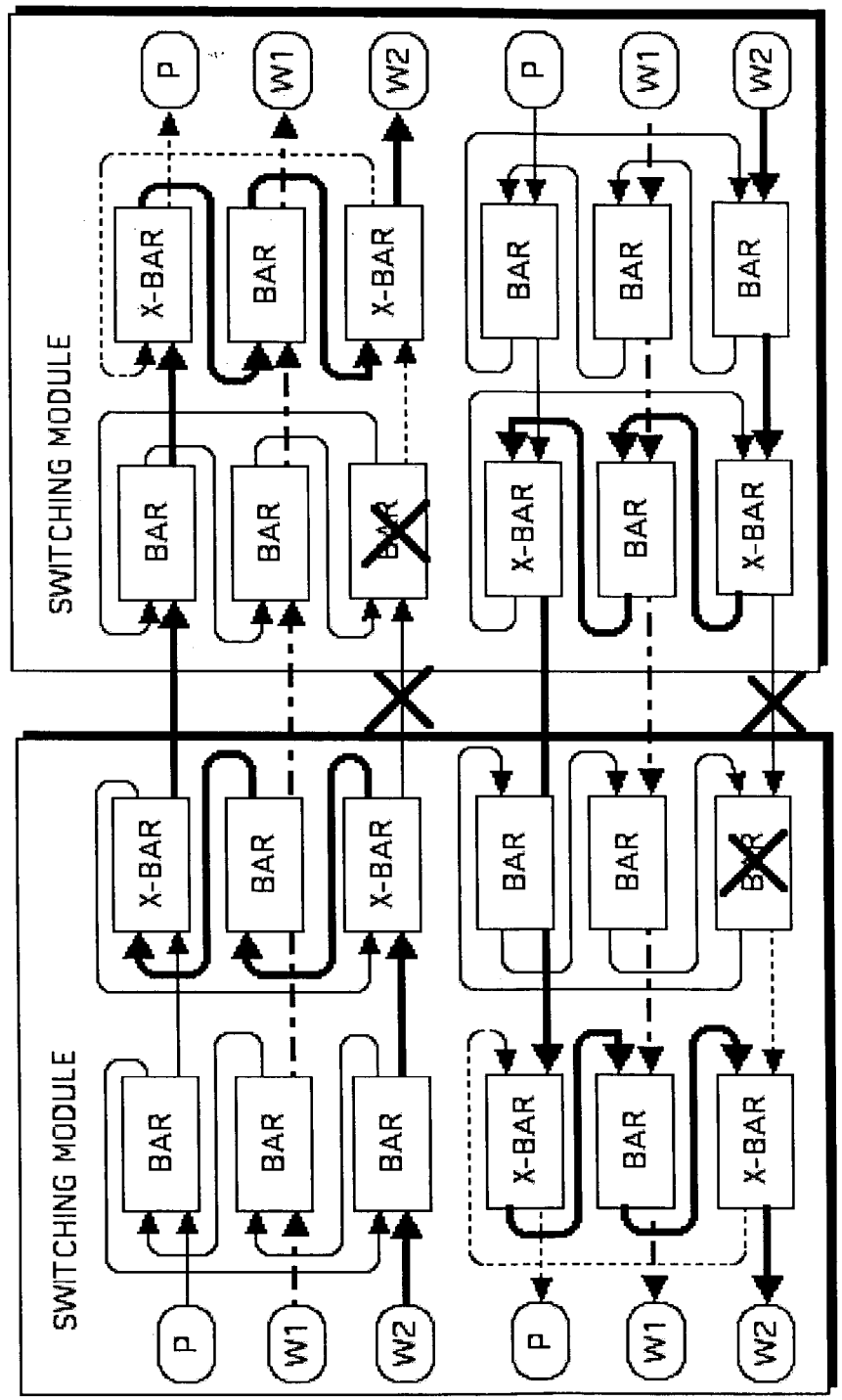
FIG. 9 shows the operation and switch modes of the embodiment after fault was detected.
Figure 10:
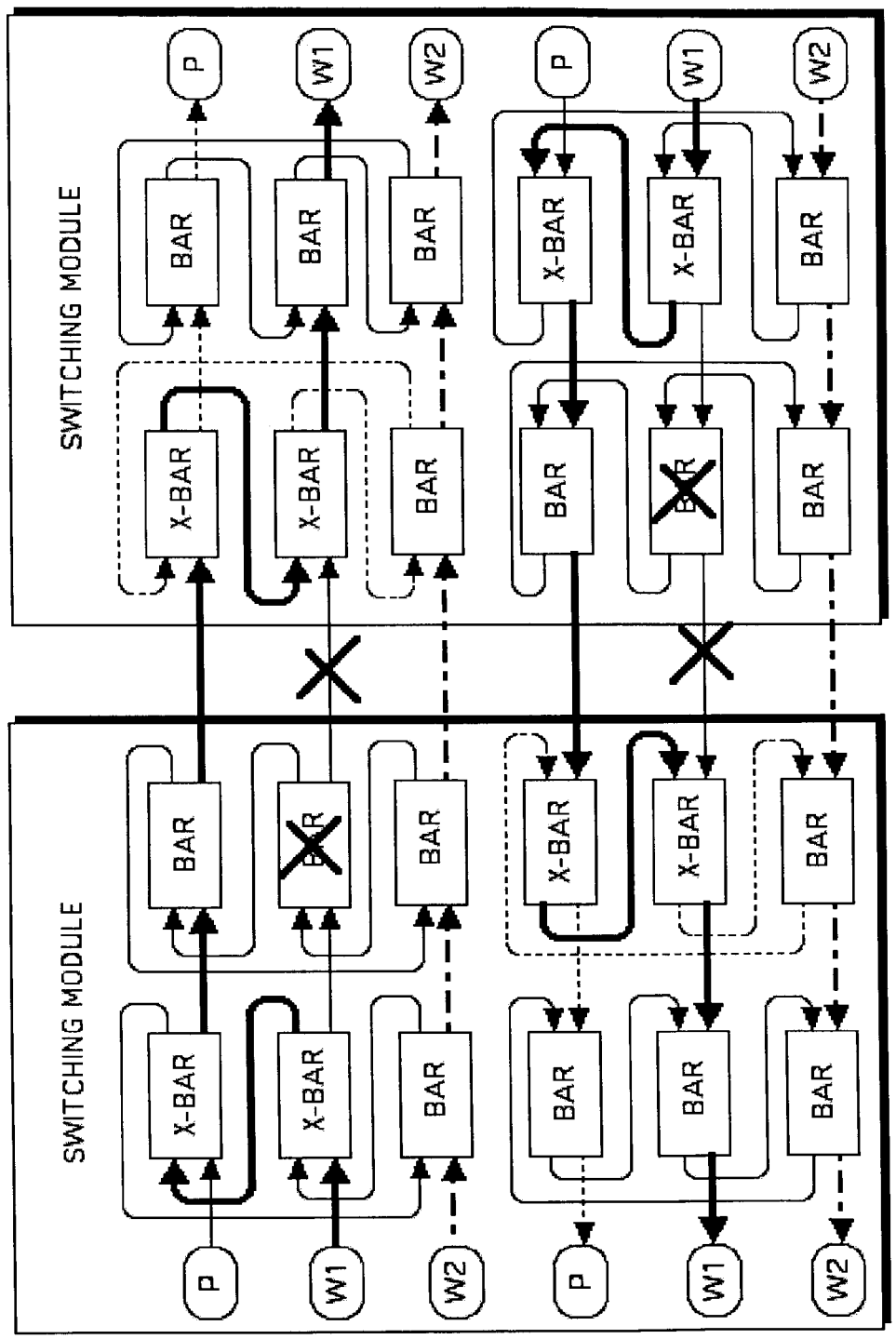
FIG. 10 shows the operation and switch modes of the embodiment after fault was detected.

FIGS. 9 and 10 show the operation and switch modes for the embodiment after a fault was detected in two receiving switches and/or the two optical lines leading to them, which fault is indicated in each case by the X. As shown in the attached FIGS. 9-10, signals from the protection transmitter P and the working transmitters 1W and W2 respectively go to the protection receiver P and the working receivers W1 and W2. Of course, the embodiment will function for only one switch fault and two have been shown merely as an example. Of course, the embodiment will function for only one line fault and two have been shown merely as an example. The BAR and X-BAR states of the switches are shown. The newly created operative path is shown in darker lines for clarity of illustration.

Accordingly, the present invention is generally used for an optical transmission fiber network using WDM (although WDM is not critical) for increasing the availability of the network upon the occurrence of a fault in a transmission optical fiber or in a switch, particularly with respect to optical backbone networks and metro area networks. Network providers, such as a U.S. carrier, can provide a reliable optical network to their customers and a flexible protection system according to the present invention.

While the present invention has been described in connection with a number of embodiments and implementations, the present invention is not so limited but covers various obvious modifications and equivalent arrangements, which fall within the purview of the appended claims.

What is claimed is:

1. A network node having a fault protection switching device, said switching device comprising:
   first and second optical switch modules, each having a first and a second input port and a first and a second output port respectively connected in a first mode of operation and cross-connected in a second mode of operation;
   working optical fiber transmission lines respectively connected to the second input port and the second output port of the second optical switch module to be through connected in said first mode;
   protection optical fiber transmission lines connected to the second input port and the second output port of the first optical switch module to be through connected in said first mode;
   a first optical fiber line connected to the first output port of the first optical switch module and the first input port of the second optical switch module;
   a second optical fiber line connected to the first output port of the second optical switch module and the first input port of the first optical switch module to be through connected with the first optical fiber line in said first mode; and,
   wherein said first and second switch modules do not include a wavelength slicer.

2. The network node of claim 1, wherein
   there are N of said optical switch modules, with N being a whole number equal to three or more; and
   said first output port of the N-1 switch module is connected by one of said protection optical fiber transmission lines to said first input port of the N switch module and said first input port of the N-1 switch module is connected by another of said protection optical fiber transmission lines to said first output port of the N-2 switch module, for any one of said switch modules being the N switch module so that in the first mode of operation all of said protection optical fiber transmission lines are coupled in a single closed loop for the first mode.

3. The network node of claim 2, wherein
   said switch modules constitute a first group;
   said network node is in a ring topology network with one half of said switch modules transmitting with respect to said working optical fiber transmission lines in one direction of the ring and the other half of said switch modules transmitting in the other direction of the ring topology network;
   said network node further comprises a second group of additional optical switch modules arranged as a mirror image of said first group; and
   one-third of said working optical fiber transmission lines are connected between input ports and output ports of said first and second groups.

4. The network node of claim 3, wherein
   said network node is in a mesh topology network with a plurality of other nodes; and
   with respect to each other node, said network node is in said ring topology network.

5. The network node of claim 1, wherein
   there are two of said switch modules; and
   one of said output ports of one of said switch modules is connected by one of said protection optical fiber transmission lines to one of said input ports of the other of said switch modules, and one of said output ports of the other of said switch modules is connected by another of said protection optical fiber transmission lines to one of said input ports of the one of said switch modules, so that in the first mode of operation said protection optical fiber transmission lines are coupled in a single closed loop for the first mode.

6. The network node of claim 5, wherein
   said switch modules constitute a first group;
   said network node is in a ring topology network with one half of said switch modules transmitting with respect to said working optical fiber transmission lines in one direction of the ring and the other half of said switch modules transmitting in the other direction of the ring topology network;
   said network node further comprises a second group of additional optical switch modules arranged as a mirror image of said first group; and
   one-third of said working optical fiber transmission lines are connected between input ports and output ports of said first and second groups.

7. The network node of claim 6, wherein
   said network node is in a meshtopology network with a plurality of other nodes; and
   with respect to each other node, said network node is in said ring topology network.

8. A network node operation method having fault protection switching, said method comprising:
   providing first and second optical switch modules, each having first and second optical fiber input ports and first and second optical fiber output ports;
   for each of the first and second optical switch modules, through connecting the input and output ports in a first mode and cross-connecting the input and output ports in a second mode;
   connecting working optical fiber transmission lines respectively to the first input ports and the first output ports to be through connected in the first mode;
   connecting protection optical fiber transmission lines respectively to the second input ports and the second output ports to be through connected in the first mode and cross-connected with the working optical fiber transmission lines in the second mode;
   for each of the first and second optical switch modules, connecting each protection optical fiber transmission line between an output port of one switch module and an input port of the other switch module; and
   selectively changing the mode of the switch modules and bypassing one of a working optical fiber transmission line and a switch module; and,
   wherein said first and second switch modules do not include a wavelength slicer.

9. The network node operation method of claim 8, wherein
   said selectively changing provides one combination of modes bypassing a working optical fiber transmission line and another combination of modes bypassing a switch module.

10. The network node operation method of claim 8,
    wherein said step of providing provides N switch modules, with N being a whole number equal to three or more; and
    further comprising connecting the protection optical fiber transmission line between the second output port of the N-1 switch module and the second input port of the N switch module, and connecting a different protection optical fiber transmission line between the second input port of the N-1 switch module and the second output port of the N-2 switch module, for each switch module being the N switch module, thereby connecting the protection optical fiber transmission lines in a single closed loop for the first mode.

11. The network node operation method of claim 10, wherein transmitting in one direction of a ring topology network with one half of the switch modules and in another direction with the other half of the switch modules;

connecting a second group of additional optical switch modules as a mirror image of the first group provided by said step of providing; and connecting one-third of the working optical fiber transmission lines between the first group input ports and the second group output ports.

12. The network node operation method of claim 11, further comprising:

transmitting and receiving, according to the ring topology, to and from each other node of a mesh topology network.

13. The network node operation method of claim 12, wherein said selectively changing provides one combination of modes bypassing a working optical fiber transmission line and another combination of modes bypassing a switch module.

14. The network node operation method of claim 13, further comprising monitoring correction of a line fault during the one combination of modes bypassing a working optical fiber transmission line and monitoring correction of a switch fault during the another combination of modes bypassing a switch module, by transmitting a fault check signal respectively toward the bypassed line and switch.

15. The network node operation method of claim 10, wherein said selectively changing provides one combination of modes bypassing a working optical fiber transmission line and another combination of modes bypassing a switch module.

16. The network node operation method of claim 15, further comprising monitoring correction of a line fault during the one combination of modes bypassing a working optical fiber transmission line and monitoring correction of a switch fault during the another combination of modes bypassing a switch module, by transmitting a fault check signal respectively toward the bypassed line and switch.

17. The network node operation method of claim 11, wherein said selectively changing provides one combination of modes bypassing a working optical fiber transmission line and another combination of modes bypassing a switch module.

18. The network node operation method of claim 17, further comprising monitoring correction of a line fault during the one combination of modes bypassing a working optical fiber transmission line and monitoring correction of a switch fault during the another combination of modes bypassing a switch module, by 1 a fault check signal respectively toward the bypassed line and switch.

19. The network node operation method of claim 8, wherein there are two switch modules; and connecting a protection optical fiber transmission line between an output port of one switch module and an input port of the other switch module, and connecting another protection optical fiber transmission line between an output port of the other switch module and an input port of the one switch module, thereby connecting protection optical fiber transmission lines in a single closed loop for the first mode.

20. The network node operation method of claim 19, further including:

transmitting in one direction of a ring topology network with one switch module and in another direction with the other switch module;

connecting two additional optical switch modules as a mirror image of the switch modules provided by said step of providing;

connecting working optical fiber transmission lines between input ports of the additional optical switch modules and output ports of the switch modules provided by said step of providing; and connecting working optical fiber transmission lines between output ports of the additional optical switch modules and input ports of the switch modules provided by said step of providing.

21. The network node operation method of claim 20, further comprising:

transmitting and receiving, according to the ring topology, to and from each other node of a mesh topology network.

22. The network node operation method of claim 21, wherein said selectively changing provides one combination of modes bypassing a working optical fiber transmission line and another combination of modes bypassing a switch module.

23. The network node operation method of claim 22, further comprising monitoring correction of a line fault during the one combination of modes bypassing a working optical fiber transmission line and monitoring correction of a switch fault during the another combination of modes bypassing a switch module, by transmitting a fault check signal respectively toward the bypassed line and switch.

24. The network node operation method of claim 20, wherein said selectively changing provides one combination of modes bypassing a working optical fiber transmission line and another combination of modes bypassing a switch module.

25. The network node operation method of claim 24, further comprising monitoring correction of a line fault during the one combination of modes bypassing a working optical fiber transmission line and monitoring correction of a switch fault during the another combination of modes bypassing a switch module, by transmitting a fault check signal respectively toward the bypassed line and switch.

26. The network node operation method of claim 19, wherein said selectively changing provides one combination of modes bypassing a working optical fiber transmission line and another combination of modes bypassing a switch module.

27. The network node operation method of claim 26, further comprising monitoring correction of a line fault during the one combination of modes bypassing a working optical fiber transmission line and monitoring correction of a switch fault during the another combination of modes bypassing a switch module, by transmitting a fault check signal respectively toward the bypassed line and switch.

28. A fault protection switching device comprising:

N optical switch modules, N being an integer equal or greater than 2, each switch module having a first and a second input port and a first and a second output port; and at least 2 optical fiber lines;

wherein for an integer i selected from the integers ranging from 2 through N, the first output port of the i-$1^{st}$ switch module is connected to the first input port of the $i^{th}$ switch module by one optical fiber line, and the first output port of the $i^{th}$ switch module is connected to the first input port of the i-$1^{st}$ switch module by another optical fiber line; and in a first mode of operation, the first input port of the $i^{th}$ switch module is through connected with the first output port of the $i^{th}$ switch module, or the second input port of the i-$1^{st}$ module is through connected with the second output port of the i-$1^{st}$ module, in single or in combination, in a second mode of operation the first input port of the i-$1^{st}$ switch module is cross-connected with the second output port of the i-$1^{st}$ switch module, or the second input port of the $i^{th}$ module is cross-connected with the first output port of the $i^{th}$ switch module, in single or in combination, and none of the N modules include a wavelength slicer.

29. The network node of claim 28, wherein said switch modules constitute a first group in a network node;

said network node is in a ring topology network with one half of said switch modules transmitting with respect to working optical fiber transmission lines in one direction of the ring and the other half of said switch modules in the other direction of the ring topology network;

said network node further comprises a second group of additional optical switch modules arranged as a mirror image of said first group; and one-third of said working optical fiber transmission lines are connected between input ports and output ports of said first and second groups.

30. The network node of claim 29, wherein said network node is in a mesh topology network with a plurality of other nodes; and with respect to each other node, said network node is in said ring topology network.

31. A network node comprising:

N optical switching modules, each switching module having a first and a second input port and a first and a second output port, N being an integer equal or greater than 2; and, optical fiber lines comprising at least one protection line connected from the first output port of the i-$1^{st}$ switching module to the first input port of the $i^{th}$ switching module, and one working line connected from the second output port of the i-$1^{st}$ switching module to the second input port of the $i^{th}$ switching module, i being an integer selected from the integers ranging from 2 through N;

wherein:

in a first mode of operation the switching modules are operable to through-connect another working line from the second input port of the i-$1^{st}$ switching module to the second output port of the i-$1^{st}$ switching module and to the second output port of the $i^{st}$ optical switching module, or to through-connect another protection line from the first input port of the i-$1^{st}$ optical switching module to the first output port of the i-$1^{st}$ optical switching module and to the first output port of the $i^{th}$ optical switching module, in single or in combination; and in a second mode of operation the switching modules are operable to cross-connect another working line from the second input port of the i-$1^{st}$ optical switching module to the first output port of the i-$1^{th}$ optical switching module and to the second output port of the $i^{th}$ optical switching module, or to cross-connect another protection line from the first input port of the i-$1^{st}$ optical switching module to the second output port of the i-$1^{st}$ optical switching module and to the first output port of the $i^{th}$ optical switching module, in single or in combination; and none of the switching modules include a wavelength slicer.

32. The network node of claim 31, wherein said switching modules constitute a first group;

said network node is in a ring topology network with one half of said switching modules transmitting with respect to working optical fiber transmission lines in one direction of the ring and the other half of said switching modules transmitting in the other direction of the ring topology network;

said network node further comprises a second group of additional optical switching modules arranged as a mirror image of said first group; and one-third of said working optical fiber transmission lines are connected between input ports and output ports of said first and second groups.

33. The network node of claim 32, wherein said network node is in a mesh topology network with a plurality of other nodes; and with respect to each other node, said network node is in said ring topology network.

* * * * *